United States Patent
Häusl

(10) Patent No.: US 12,343,949 B2
(45) Date of Patent: Jul. 1, 2025

(54) NOZZLE BOX AS WELL AS A STRETCHING UNIT COMPRISING A CORRESPONDING NOZZLE BOX

(71) Applicant: Brückner Maschinenbau GmbH, Siegsdorf (DE)

(72) Inventor: Tobias Häusl, Traunstein (DE)

(73) Assignee: Brückner Maschinenbau GmbH, Siegsdorf (DE)

( * ) Notice: Subject to any disclaimer, the term of this patent is extended or adjusted under 35 U.S.C. 154(b) by 255 days.

(21) Appl. No.: 18/096,170

(22) Filed: Jan. 12, 2023

(65) Prior Publication Data
US 2023/0219309 A1     Jul. 13, 2023

(30) Foreign Application Priority Data
Jan. 13, 2022    (DE) ..................... 10 2022 100 704.9

(51) Int. Cl.
| | |
|---|---|
| *B29C 55/00* | (2006.01) |
| *B29C 71/02* | (2006.01) |
| *B29C 55/02* | (2006.01) |

(52) U.S. Cl.
CPC .............. *B29C 71/02* (2013.01); *B29C 55/02* (2013.01)

(58) Field of Classification Search
CPC . F26B 21/004; B05B 1/044; B65H 2406/122; B65H 2301/5143; B65H 2301/5144; B65H 2301/517; B29C 2035/0283; B29C 2035/045; B29C 2035/046; B29C 55/00; B29C 55/02

(Continued)

(56) References Cited

U.S. PATENT DOCUMENTS

| | | |
|---|---|---|
| 23,384 A | 3/1859 | Morrett |
| RE23,384 E | 7/1951 | Dungler |

(Continued)

FOREIGN PATENT DOCUMENTS

| | | |
|---|---|---|
| CN | 103206845 A | 7/2013 |
| CN | 106003679 | 11/2020 |

(Continued)

OTHER PUBLICATIONS

Notice of Refusal with English Translation for Japanese Application No. 2023-002042, eight pages, dated Jun. 11, 2024.

(Continued)

*Primary Examiner* — Thu Khanh T. Nguyen
(74) *Attorney, Agent, or Firm* — Nixon & Vanderhye P.C.

(57) ABSTRACT

An improved nozzle box is disclosed having side walls spaced apart from each other, a base and a ventilation wall spaced apart from it, thereby forming an interior space. A plurality of ventilation openings arranged offset to each other is provided in the ventilation wall, the nozzle box is provided on its ventilation wall with a plurality of protrusions that are raised by at least a height (H) in relation to the sections of ventilation wall or the top side or surface of the ventilation wall the sections being located adjacent to the protrusions, the ventilation openings are configured raised in the region of the protrusions in relation to the top side or surface of the ventilation wall and/or the ventilation wall includes in the transverse direction (Q) of the nozzle box opposing side flanges that overlap the side walls of the nozzle box outside the interior space of the nozzle box.

13 Claims, 5 Drawing Sheets

Figure 1:
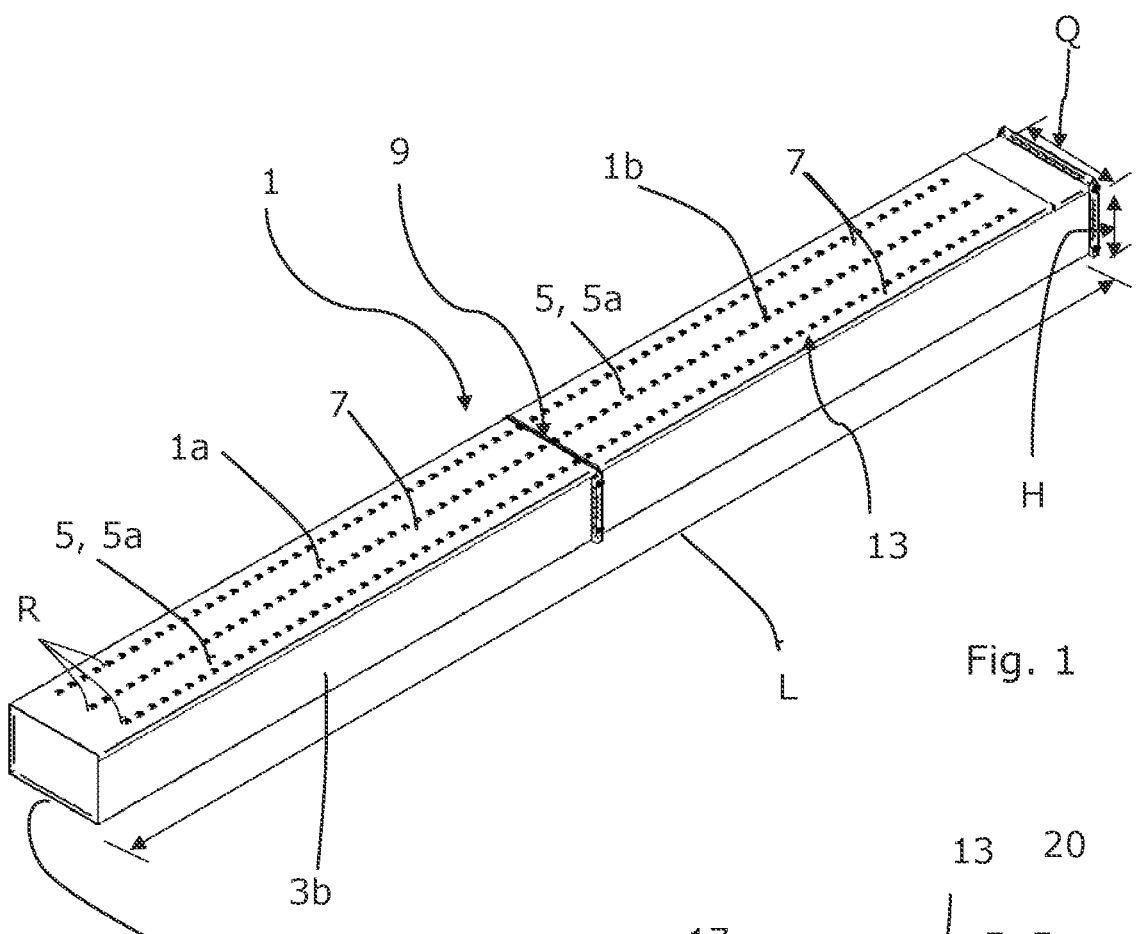

(58) Field of Classification Search
USPC .................... 264/345, 346, 348; 34/638, 643
See application file for complete search history.

(56) References Cited

U.S. PATENT DOCUMENTS

| | | | |
|---|---|---|---|
| 2013/0046069 A1* | 2/2013 | Meyer | B29C 48/08 |
| | | | 526/346 |
| 2020/0108572 A1* | 4/2020 | Höglauer | B29C 37/0089 |
| 2021/0016486 A1* | 1/2021 | Knoche | B29C 48/08 |
| 2021/0122102 A1* | 4/2021 | Baumeister | B29C 35/16 |

FOREIGN PATENT DOCUMENTS

| | | |
|---|---|---|
| EP | 0 979 985 | 2/2000 |
| EP | 0 907 476 | 3/2003 |
| JP | 2007170564 A | 7/2007 |
| JP | 2008213470 A | 9/2008 |
| JP | 3228071 U | 9/2020 |
| KR | 20110102194 A | 9/2011 |

OTHER PUBLICATIONS

European Search Report for Application No. 23150792.2, 10 pages, dated Aug. 21, 2023.

* cited by examiner

NOZZLE BOX AS WELL AS A STRETCHING UNIT COMPRISING A CORRESPONDING NOZZLE BOX

CROSS RELATED APPLICATION

This application claims priority to German Patent Application DE 10 2022 100 704.9, filed Jan. 13, 2022, the entire contents of which is hereby incorporated by reference.

The invention relates to a nozzle box according to the broader term of claim 1 as well as stretching unit comprising a corresponding nozzle box.

Such nozzle boxes are used, for example, for heating and cooling web-shaped materials, in particular in the form of plastics films in the production of plastics films. Such a nozzle box serving as ventilation nozzle is typically arranged transversely, i.e. usually perpendicular to the drawing direction of the material web and thus transverse to the web travel direction above and/or below the material web.

Thus, for example, two or more such nozzle boxes can be assembled together to a ventilation field above as well as below a material web, namely under the configuration of what is termed a ventilation module. These ventilation modules including the corresponding nozzle box can then comprise, for example, a length extending transverse across the material web of up to 1.5 m, 3 m, 5 m, 7.5 m or, for example, also up to 10 m and more.

Depending on the application, the air and thus the plastics film can be heated via these ventilation modules, for example in a preheating zone of a stretching unit. To this end, the air is usually warmed and heated up via a heating system/heating unit. If the ventilation module is deployed in a cooling zone, the film can also be cooled via correspondingly cooled air. In this case, the ambient air is drawn in and blown onto the film. It is also possible that the air is cooled in advance or that an air mixture comprising ambient air and hot air is used. In the recirculation mode, colder air (in comparison to the temperature of the film) is often blown onto the film.

The ventilation modules can be constructed to be closed (recirculation systems) or to be open (ambient air is used). In the case of heating material webs or in particular plastics films, a closed ventilation system is commonly used which blows air into the nozzle box interior spaces via ventilators arranged on the sides. From here, the air is then blown out in the direction of the material web/plastics film via outlet openings or nozzle openings in the nozzle boxes. Above and below the nozzle boxes, the blown air can flow back between these boxes. In addition, for example, what are termed return boxes are provided above or below the nozzle boxes, or even just a free space, in order to draw back the air blown out there and then to heat it in the closed system once more and to supply it again to the nozzle boxes via the ventilators. Heat exchangers can be used, for example, for this heating. In this recirculation mode, the air can also be circulated several times.

The aforementioned ventilation module comprising the nozzle boxes can be used in a preferred embodiment of the invention in transverse direction orienters or transverse stretching ovens, in particular for sequential film-stretching units or in simultaneous film-stretching units.

A nozzle box suitable for the described purposes is known, for example, from EP 0 907 476 B1. The nozzle box known here comprises several interconnected air-supply chambers in its interior that extend in the longitudinal direction of the nozzle box. The nozzle box itself comprises a ventilation or nozzle wall or side, in which a plurality of ventilation openings, thus outlet openings or outlets, are usually configured for blowing out air. Often, a plurality of hole-shaped ventilation openings is configured in several parallel rows arranged side by side. To this end, the nozzle boxes are usually assembled above and below the material web in a stretching unit in such a way that what is referred to as the ventilation or nozzle wall is aligned facing the material web. The design of the outlet openings or outlets itself can be configured differently so that both hole-shaped as well as, for example, nozzle boxes with slit-shaped outlet openings are possible.

The air nozzle device is also known from CN 106003679 B. A plurality of outlet openings that can be provided in a specific arrangement pattern are configured on the nozzle outlet side of a nozzle wall. To achieve certain effects, cylinder-shaped protrusions are provided on the inner side of nozzles (thus on the inner side situated opposite the outlet side of the nozzles), thereby increasing the length of the nozzles.

For completeness, it is also mentioned that above all in the case of long nozzle boxes that these comprise or can comprise at least two or more parts due to production reasons which are assembled together in the longitudinal direction for use in a stretching unit.

In particular in the manufacture and stretching of plastics films that are to be used as battery separator films (thus in particular in what is termed a WET process), a range of admixtures and in doing so in particular oil are admixed to the material of the plastics film to be stretched, said oil which in turn escapes and exudes from the material of the moving material web when the film passes through an oven during the stretching process. This results in the exuding oil being deposited in the region of the ventilation wall of the nozzle box, in particular in the nozzle boxes positioned below the moving plastics film. From there, the exuded oil can then even enter the interior of the nozzle channel via the outlets.

The penetration of the oil is however not limited to the outlets. Oil can enter into the interior of the nozzle box via any conceivable openings, recesses or slits, thus for example also via the sites of the flanges, interconnecting points of sheets etc.

This then results in the oil that ultimately reaches the interior of the nozzle box being taken and blown out in part again by the recirculated air during operation with the result that this oil reaches the surface of the plastics film to be stretched and leads to an unwanted impairment in the quality of the plastics film to be produced, i.e. to be stretched.

It is therefore the object of the present invention to create an improved nozzle box, in particular for a ventilation module as well as a stretching unit with such a nozzle box.

The object is solved with regard to the ventilation module by means of a nozzle box with the features of claim 1 and with regard to the stretching unit with the features according to claim 13. Advantageous embodiments of the design are indicated in the dependent claims.

The solution according to the invention is primarily characterized by the fact that the use of simple measures can prevent oil from entering the region of the nozzle openings and via these into the interior of the nozzle box. Therefore, it also prevents the gaseous process medium exiting through the nozzle openings (usually in the form of air) from swirling up oil deposited in the interior of the nozzle box or oil droplets found there and from bringing this oil towards the film, thereby preventing an unwanted depositing of this oil contamination on the plastics film. If "film" is referred to at this point or also later, this means any possible material web in this case, irrespective of whether it is termed a plastics film or just a film.

According to the invention, this is ensured by a preferred specially configured protruding section that is provided or configured around the ventilation openings. Alternatively or preferably supplementary to this, the ventilation wall has a specific design comprising side flanges opposite the nozzle box in the transverse direction, said side flanges overlapping the side walls of the nozzle box outside of the interior space of the nozzle box.

In a preferred variant design, this protruding section can be made in the ventilation wall of the nozzle box that preferably consists of a metal sheet wall by means of a simple embossing process and for this reason is formed as an indentation or a deep-drawn deformation in this sheet wall. In other words, the corresponding ventilation openings comprising the aforementioned protruding sections can be created in the nozzle boxes in one single, simultaneously executed stamping and/or embossing process.

The form of the protruding sections can be configured differently, wherein an outer boundary of the ventilation protrusion is preferred that tapers at least slightly conically from the plane and the external side of the ventilation wall in the direction of the protrusion. The configuration of the protruding sections is, in particular in the case of circular ventilation openings, thus preferably frusto-conical, i.e. comprising a flattened end face for the protruding sections, wherein this end-face section surrounding the ventilation openings, for example in the case of circular or oval ventilation openings, has a width that can preferably vary between 0.5 mm and 5 mm.

The opening angle of the cone, thus the angle of the outer boundary of the protruding sections that is more or less steeply angled and surrounds the ventilation openings must deviate only by the smallest angle in relation to one of straight lines perpendicular to the ventilation wall so that a cylinder is not formed. Angles of less than or equal to 89.75° are already favorable and have advantages for an embossing process. However, the angle itself can be or adopt a smaller value, for example 45° or less. All values between these specified angles are also suitable.

Moreover, provided in a preferred embodiment is that the ventilation wall of the nozzle box provided with ventilation openings is configured continuously in the transverse direction of the nozzle box, thus is not assembled together by several laterally interconnected ventilation wall sections running parallel next to one another in the longitudinal direction of the nozzle box. As a result, oil is prevented from reaching the interior of the nozzle box through slit-shaped gaps formed on the lateral flanges of such a multipart ventilation wall of a nozzle box and being transported from there in turn further outwards by the supplied air via the ventilation openings in the direction of the plastics film.

Preferably, the continuous ventilation wall in the transverse direction of the nozzle box is also provided externally in each case with an angular flange protruding from the ventilation wall which overlaps the adjoining side wall of the nozzle box externally so that oil here cannot reach the interior of the nozzle box.

If the nozzle box consists of at least two or more parts due to its large length, said parts are assembled together in the longitudinal direction, specifically raised ventilation-wall edge sections are provided here additionally on the ventilation wall (in addition to preferably overlapping wall sections) so that no slits extending from the top or external side into the interior of the nozzle box are configured here, said slits ending on the plane of the top side or surface of the nozzle openings, via which oil could penetrate into the interior of the nozzle box.

The aforementioned protruding sections and this in particular their heights can be very small in size within the scope of the invention.

Ultimately, the aforementioned protruding section can also be configured in such a way that not only one ventilation opening, but for example two ventilation openings (or even more) are configured in the raised flat elevation. In other words, a discrete, separate protrusion must not be configured for each ventilation opening.

Further advantages, specifications and features of the invention are found hereinafter in the embodiments shown by means of the drawings.

Figure 2:
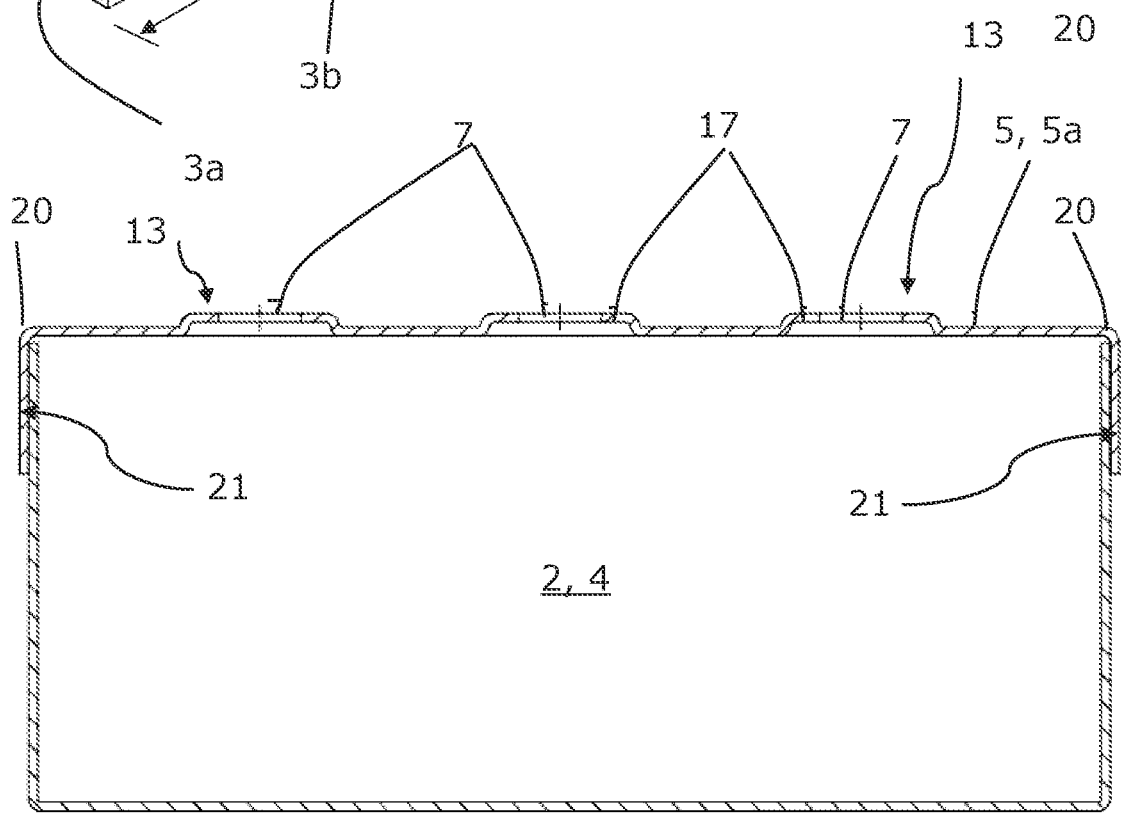
Figure 3:
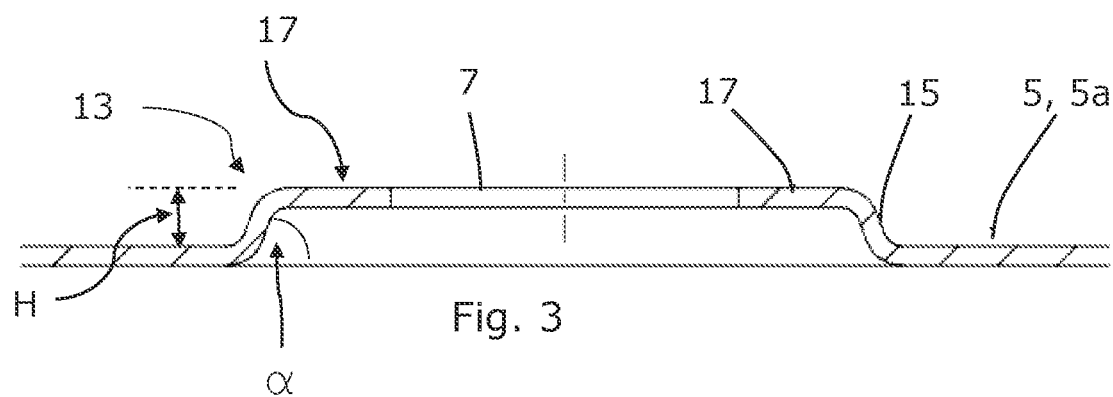
Figure 4:
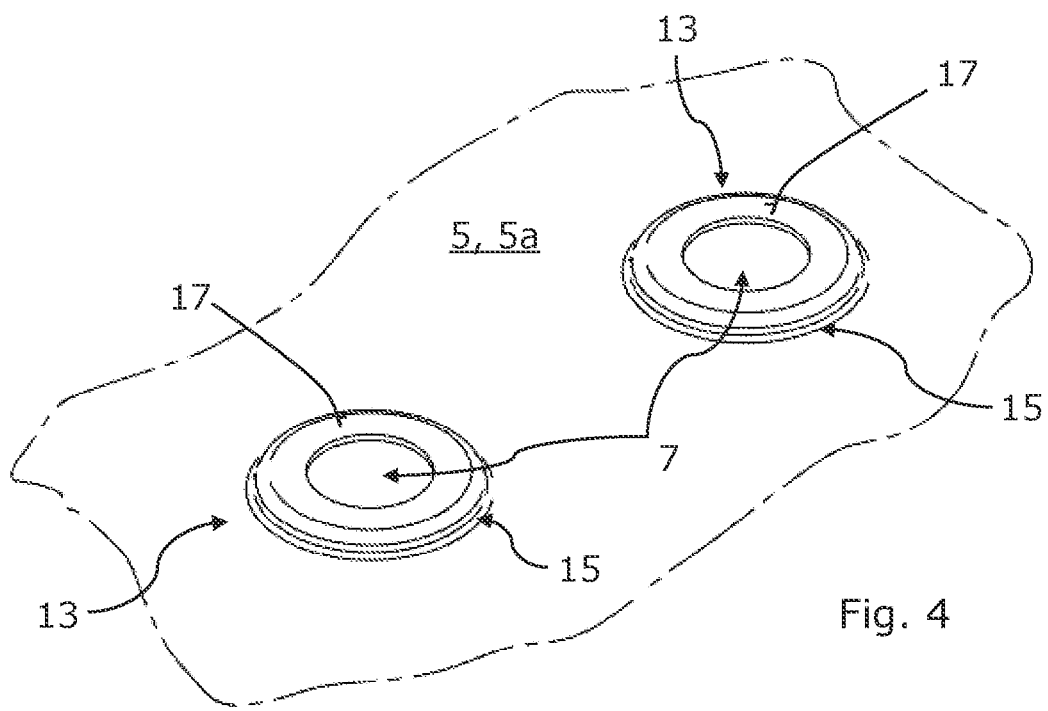
Figure 5:
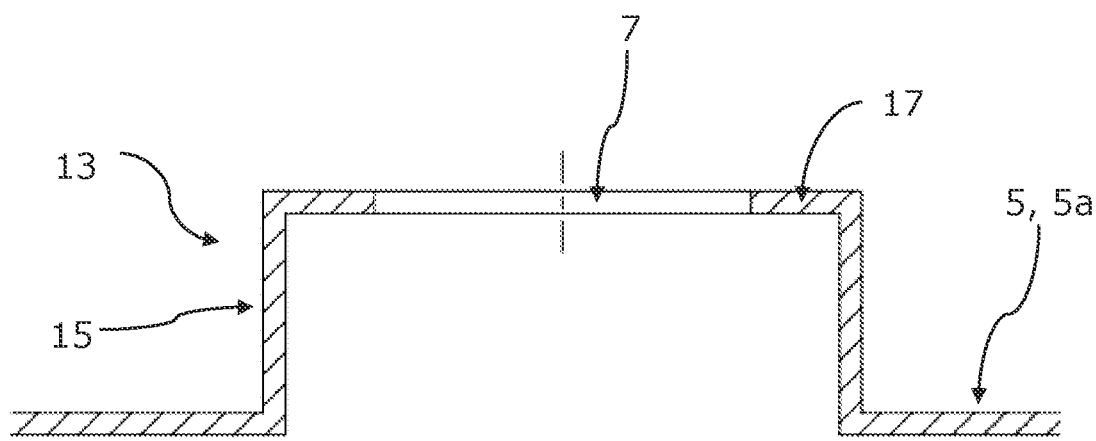
Figure 6A:
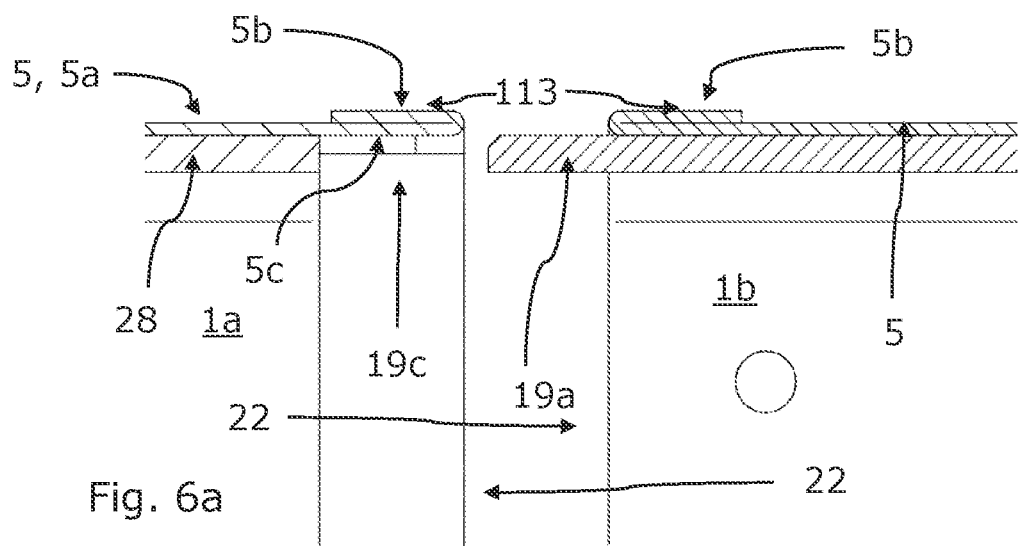
Figure 6B:
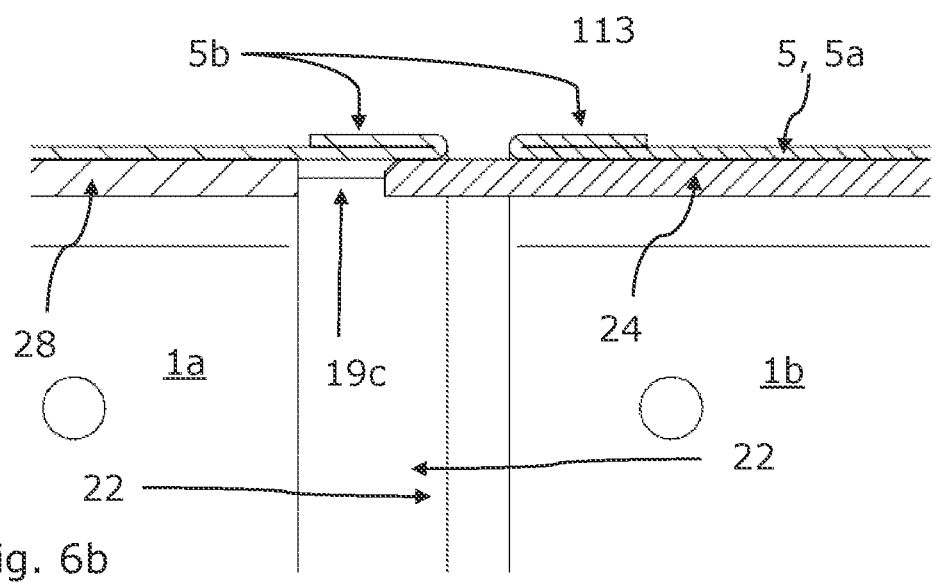
Figure 6C:
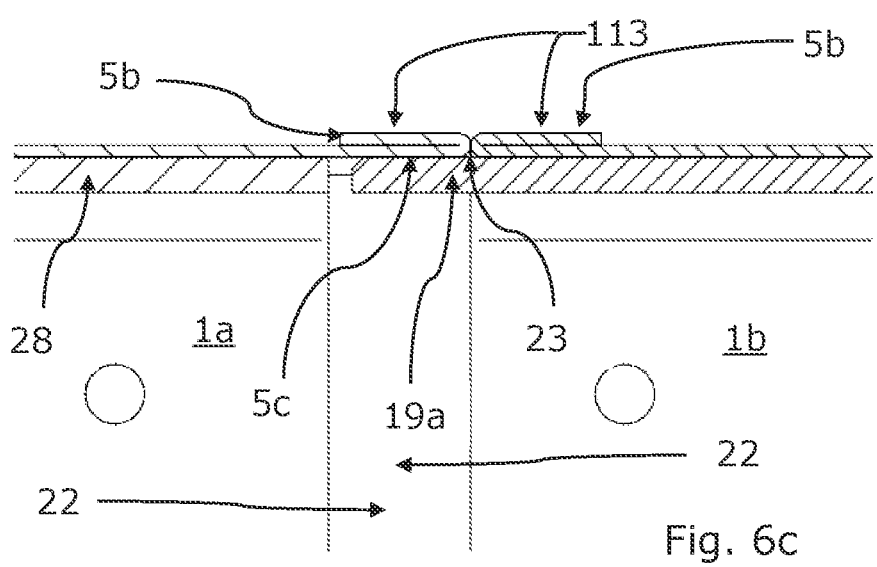
Figure 7A:
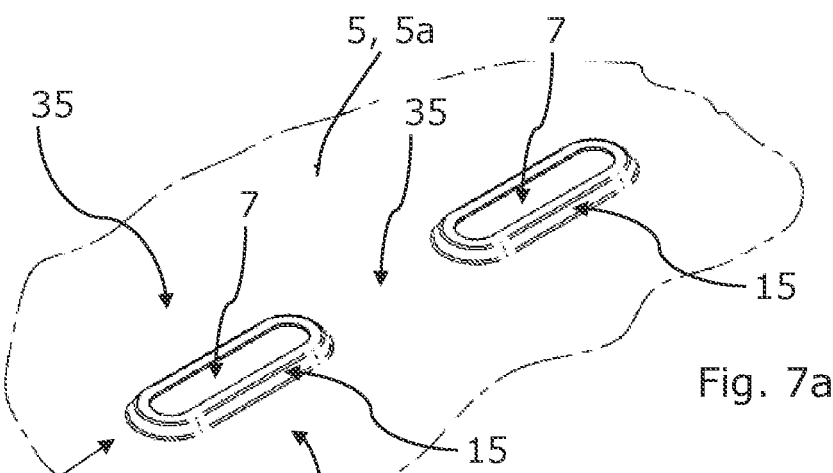
Figure 7B:
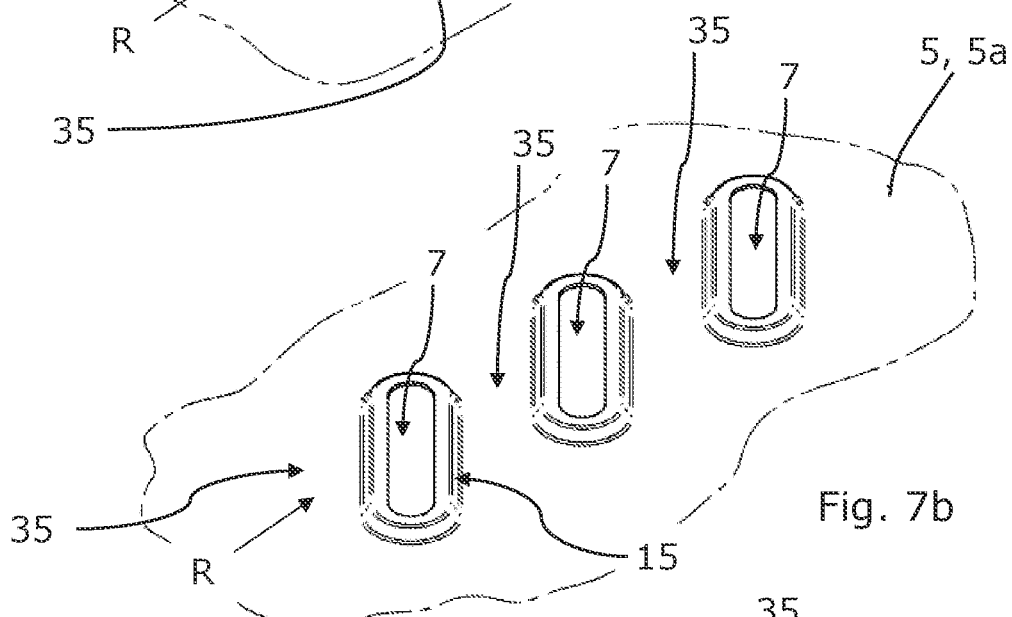
Figure 7C:
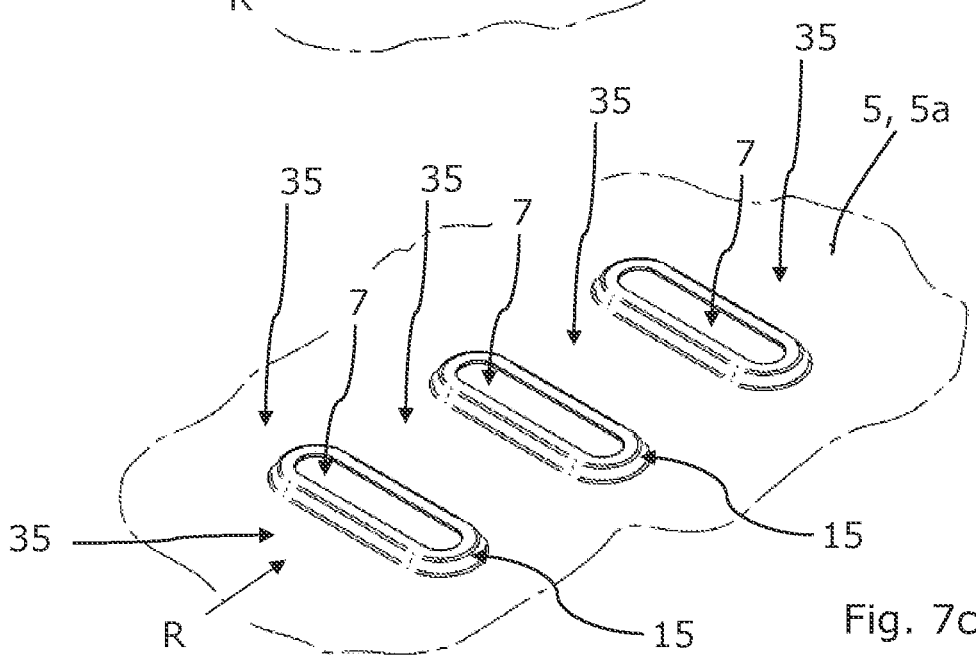
Figure 8:
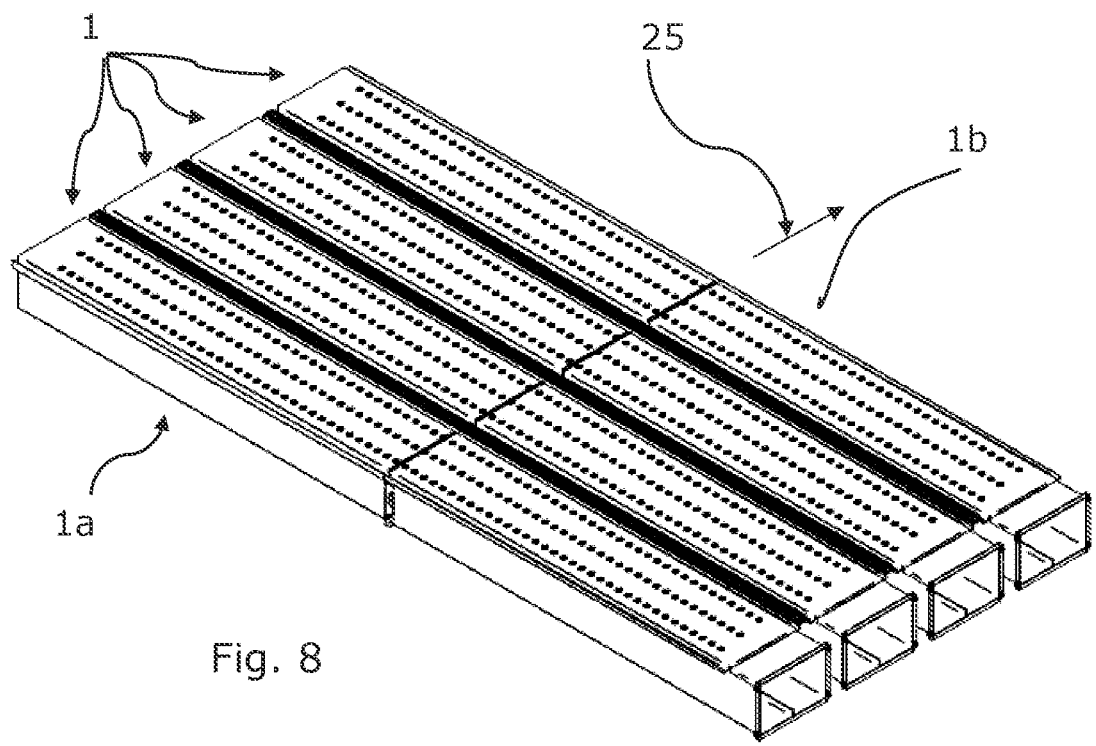

Thus, shown in detail:

FIG. 1: a schematic spatial view of a nozzle box according to the invention;

FIG. 2: a schematic cross-sectional view in the transverse direction and perpendicular to the longitudinal direction of the nozzle box shown in FIG. 1;

FIG. 3: an enlarged detailed view of a ventilation opening in the region of a protrusion in cross-section that is configured on a ventilation wall of the nozzle box shown in FIGS. 1 and 2;

FIG. 4: a partial spatial view of two protrusions situated adjacent to each other comprising ventilation openings formed therein;

FIG. 5: a slightly modified embodiment of FIGS. 3 and 4;

FIGS. 6a to 6c: three partial perpendicular cross-sectional views in the longitudinal direction of two nozzle channel sections that can be assembled together in these regions at the end faces, and namely once before the assembly, during being slid together on the end faces and after the completed end-face assembly of two nozzle boxes;

FIGS. 7a to 7c:
three different examples in top view for clarification of how ventilation openings can be configured and aligned differently;

FIG. 8: a schematic view of a ventilation module comprising four nozzle boxes according to the invention that are arranged in a parallel configuration and offset to one another with the lateral offset in the drawing direction of a material web; and FIG. 9: a schematic end-face view of several nozzle boxes arranged above and below the material web in the drawing direction of a plastics film web, wherein drainage and/or collection containers for collecting the oil are located between the nozzle boxes arranged underneath the material web.

In the following, reference is made to a first embodiment of a nozzle box according to the invention.

This nozzle box 1 comprises a longitudinal direction L, and transverse direction Q and a height H. It is rectangular in shape in cross section, although this cross-sectional shape is not obligatory.

In the embodiment, the shown nozzle box 1 thus comprises a base 3a and two opposing side walls 3b that in the shown embodiment run parallel to one another with a lateral offset and are thus aligned perpendicular to the base 3a. What is termed a ventilation or nozzle wall 5 is provided above the base 3a at a distance H in relation to the base 3a.

The aforementioned side walls 3b and the base 3a as well as the ventilation or nozzle wall 5 thus surround an interior space 2 that is also referred to as the supply chamber 4 for supplying air which can then exit through the ventilation openings explained hereinafter. In the shown embodiment the nozzle box 1, as mentioned, thus comprises a rectangular cross-sectional shape, although another cross-sectional shape is possible. Thus, the side walls can also be designed to be curvilinear and merge into a base that also extends, for example, continuously in a curve in cross section without the side walls being separated from the base by clear edges. Thus, in this respect in the scope of the invention, the specific shape of the cross section of the nozzle box is not important.

In the ventilation or nozzle wall 5 extending in the longitudinal direction L, a plurality of ventilation openings 7 is configured that hereinafter is referred to in part also as nozzle openings or ventilation openings or in general as openings 7 irrespective of the specific shape of their opening (thus for example as round, slip-shaped or quadratic openings etc.). In the shown embodiment, these ventilation openings 7 are configured not only situated offset to one another in the ventilation or nozzle wall 5 in the longitudinal direction L, but also in several rows R positioned offset to one another in the transverse direction Q. It has already been mentioned here that the shape of these ventilation openings, as well as the arrangement in the longitudinal direction L and the transverse direction Q, can freely deviate from the shown embodiment, these ventilation openings 7 must not be arranged in relation to each other in fixed predefined rows R.

As can be seen from the shown embodiment according to FIG. 1, the nozzle box 1 comprises or can comprise two nozzle box sections 1a and 1b which are separated in the longitudinal direction L, said sections being attached and/or assembled together at least directly on end faces assigned to each other at an interface 9 thus formed for increasing the total length, in particular can be assembled at this interface 9 on site.

Illustrated by means of FIG. 2, a schematic cross section is depicted through the nozzle box 1 in the transverse direction Q, thus perpendicular to the longitudinal direction L.

As can be seen here, the ventilation openings 7 are provided and configured in the ventilation or nozzle wall 5 in the form of protrusions 13 or in the region of such protrusions 13. As the nozzle box 1 and in particular its ventilation or nozzle wall 5 primarily consists of one sheet, in particular a metal sheet, the formed ventilation openings/nozzle openings 7 thus formed and the corresponding protrusions 13 are preferably produced in a joint simultaneous embossing and stamping process.

In the shown embodiment according to FIG. 2 as well as the enlarged section view through the protrusion 13 of the ventilation opening 7 according to FIG. 3 and the partial spatial view of two protrusions 13 according to FIG. 4, the surrounding external boundary wall 15 is formed conically or at least slightly conically.

This external boundary wall 15 is thus raised converging conically from the ventilation wall 5 and the top side or surface 5a of the ventilation wall 5 formed as a result, thus frusto-conical in the shown embodiment. The actual ventilation opening 7 is limited by an encircling opening edge 17 that thus forms a blunt and thus crater-free final area for the ventilation openings 7. What is termed a "crater-free" final area is important if a film is being considered in particular as the material web. As it is to be ensured that even in the case of the film contacting the encircling opening edge 17 in the region of the ventilation openings 7 that the film is not ruptured or damaged or even torn as a result of crater-shaped fraying out of the metal. In the shown embodiment, this opening edge 17 is configured and aligned at least roughly parallel to the top side or surface 5a of the nozzle wall 5. This opening edge 17 does not necessarily have to be aligned parallel to the top side or surface 5a of the nozzle wall 5. This opening edge 17 can also still be designed curved in the section perpendicular to the surface 5a, for example convexly with preferably increasingly smaller angular deviations in the direction of the ventilation openings 7 in relation to the top side or surface 5a.

Similarly, the opening edge 17 could be aligned preferably with at least one small angle in relation to the top side or surface 5a of the nozzle wall 5. Thus, this opening edge 17 can increase at a small angle in relation to the plane of the surface 5a from the outer edge towards the actual ventilation opening 7, for example at an angle of less than 45°, less than 30°, 25°, 20°, 15°, 10° or less than 5°.

The height H of the protrusion 13 can be very small in size, for example between 0.5 mm and 10 mm. The width of the encircling opening edge 17 can also be designed to the same scale.

The slightly conically diverging configuration of the protrusions 13 is preferred if this protrusion 13 is created by means of an embossing process. However, even if the ventilation wall 5 is supposed to be cast from a plastic, such a configuration would be advantageous as the injection molding tool can then be withdrawn more easily from such a shaped protrusion. Preferably, the protrusions 13 are however manufactured in one processing step together and simultaneously with the ventilation openings 7, for example using an embossing and stamping process particularly in the case of a metal sheet or using plastic injection molding if the ventilation or nozzle wall 5 is supposed to be made of plastic.

Using FIG. 5, it is shown deviating from FIG. 3 in that the encircling external boundary wall 15 could also be configured in principle cylindrically, wherein a still slightly conical configuration is also preferred in this embodiment, said configuration extending divergently slightly conically in particular from the top side 5a of the nozzle wall 5. Hence to avoid a cylindrical configuration, the angle of inclination α (between the conically inclined boundary wall 15 and the plane of the corresponding ventilation wall 5—FIG. 3) can thus be less than 90°, for example thus amount to 89.75° or less, in particular thus less than 89.5°, 89.25°, 89°, 88°, 87°, 86°, 85°, 84°, 83°, 82° or 81° or 80° are advantageous. In other words, this angle is thus also preferably less than 60°, 50°, 45° or 40°, wherein the cone configuration then increases however in the direction of the surface of the ventilation wall 5.

Illustrated by means of FIGS. 6a to 6c, in each case in a partial longitudinal section, two adjoining ventilation walls 5, for example, of two nozzle box sections 1a and 1b to be assembled on site are shown before their assembly, during their assembly and after their assembly.

As can be seen from this, the ventilation wall 5 comprises a ventilation wall edge section 5b protruding at least in the direction of the end face 22, said ventilation wall edge section 5b being flanged with a next nozzle box in the direction opposite to the assembly direction, thus is preferably bent for example by 180°, and thus rests on the top side 5a of the ventilation wall 5 in the form of more or less a narrow edge strip. Through this flanged edge strip, another protrusion or another protruding section 113 is thus formed, wherein this protrusion 113 or this protruding section 113 forms a raised section running from the left to the right lateral edge of the nozzle box so that no oil can reach the interior of the nozzle box via a slit or assembly slit existing between two nozzle boxes assembled on their end faces.

This protective measure is increased even further as a result of providing one of two face-end ventilation walls 5 to be assembled in their end-face assembly region in the interior of the nozzle box 1 comprising at least one material tongue extending across a part of the longitudinal length of the nozzle box 1, 1b or a flange 19a. This material tongue 19a or this flange 19a projects out towards the adjoining next nozzle box 1a and is received into the adjoining end face 22 of the next nozzle box 1 in a recess 19c configured there. It is thus possible to assemble together two consecutive nozzle box sections 1a and 1b with overlapping wall sections 5 in the longitudinal direction. Here, in FIG. 6a, both end faces of the nozzle boxes are shown in part before their assembly together, in FIG. 6b when being brought together axially and in FIG. 6c after being finally fixed together when the material tongue protruding over the end face 22 of said one nozzle box 1b or the protruding flange 19a is received and enters into the end face 22 of the adjoining next nozzle box 1b and thus the dividing line 23 (FIG. 6c) comes to rest between the corresponding flanged ventilation wall edge sections 5b above this material tongue 19a. As a result, the slit 23 still present at this site is covered and sealed to the interior space of nozzle box.

As a result, the configuration prevents even the smallest slits in the assembly region through which oil deposited initially on the top side 5a of the nozzle wall 5 could penetrate into the interior space 2, thus the supply chamber 4. It therefore ensures that no droplets of oil can be carried along through the air supplied to the nozzle box 1 at the end face and conveyed again through the ventilation openings 7 towards the plastics film.

Thus, the overlapping arrangement of the ventilation or nozzle walls 5 in its end-face assembly area ensures that oil deposited on the top side 5a of the nozzle wall 5 only drains off outwards—thus towards the opposing longitudinal side of the nozzle box 1—and does not penetrate into this nozzle box.

In critical cases, a sealing material can also be used additionally which is applied during the assembly. This sealing material would then be provided in the region between the top side of the material tongue 19a and the underside of the wall section 5c located above. Therefore, the aforementioned wall section 5c would be that region which comes to rest exactly above the corresponding section of the material tongue 19a in the final assembled state, in other words thus that wall section 5 that faces the interior space 2 of the nozzle box 1 below the preferably flanged edge section 5b. In a disassembly, this seal would then have to be then removed (for example be scratched away) and a new sealing material would have to be applied during the re-assembly. The sealing material can be, for example, a high-temperature silicone or a similar or comparable material which retains its seal tightness even at high temperatures of >150° C.

However, as a rule, such sealing material is not necessary at all.

Additionally, it is noted that, for example, also a reinforcement and/or stiffening 28 can be provided on the inner side 2 of the nozzle box 1 below the ventilation or nozzle wall 5, but does not have to be provided, as is shown for example in FIGS. 6a to 6c. This reinforcement and/or stiffening 28 can be designed, for example, to be wall-shaped, rib-shaped or web-shaped, wherein here all possible design forms can be taken into consideration.

This is also the goal of the edge lips 21 shown in the cross section using FIG. 2 and configured on the lateral edge region 20 of the nozzle wall 5, said edge lips 21 each being developed opposite the ventilation/nozzle wall 5 in such a way that they overlap the side walls 3a externally, thus do not come to rest in the interior space 2 of the nozzle box. In particular, this ventilation/nozzle wall 5 comprising the ventilation/nozzle openings 7 is continuous in the transverse direction Q, thus for example not divided into two, so that even here slits or gaps cannot occur between separate assembly parts formed in such way, through said slits or gaps for example the aforementioned oil exuded from the plastics film during the stretching process can enter into the interior of the nozzle box 1.

Using FIG. 7a, it is partially shown schematically in top view that the ventilation openings 7 can also comprise completely different designs or shapes, for example can be designed oblong in shape, wherein these ventilation openings 7 can also be provided again in several rows R next to each to other.

Using FIG. 7b, a similar configuration is shown comprising ventilation openings 7 with elongated hole types that can be provided however at an inclination, thus at an acute angle to the longitudinal direction L of a nozzle box 1, for example, with 45°±less than 10° or less than 25°.

Using this view according to FIG. 7c, it can be shown exemplarily that such elongated holes can be also configured in the transverse direction Q, thus perpendicular to the longitudinal direction L in the ventilation wall of a nozzle box.

What is common to all embodiments is that the protrusions 13 (with said at least one or more ventilation openings 7 formed thereon) are provided on the top side 5a of the nozzle wall 5 under the configuration of spacings to each other in such a way that also oil deposited adjacent to the protrusions 13 on the top side or surface 5a of the ventilation and nozzle wall 5 can flow away to the left or right edge of the nozzle box (thus in the transverse direction Q of the nozzle box) and from there downwards—at least with regard to the nozzle boxes arranged under the plastics film, in the case of said nozzle boxes, the nozzle opening being situated aligned upwards towards the underside of the plastics film. In other words, many bridges of material 35 thus exist which extend on the top side 5a from the left to right lateral edge of the nozzle wall 5 so that oil deposited on the top side or surface 5a of the ventilation or nozzle wall 5 can always flow past the protrusions 13 to the lateral edge of the nozzle box.

Ultimately, reference is made to the view according to FIG. 8 in which nozzle boxes can be seen arranged in the transverse direction to the drawing direction 25 of a plastics film F, i.e. their end-face view, which are arranged spaced apart from each other below the plastics film F in the drawing direction. Typically, corresponding nozzle boxes are also arranged with the same spacing in the drawing direction and using the same vertical spacing above the control film/the material web, namely with its ventilation openings situated aligned on the top side of the plastics film, as is shown in FIG. 9.

Figure 9:
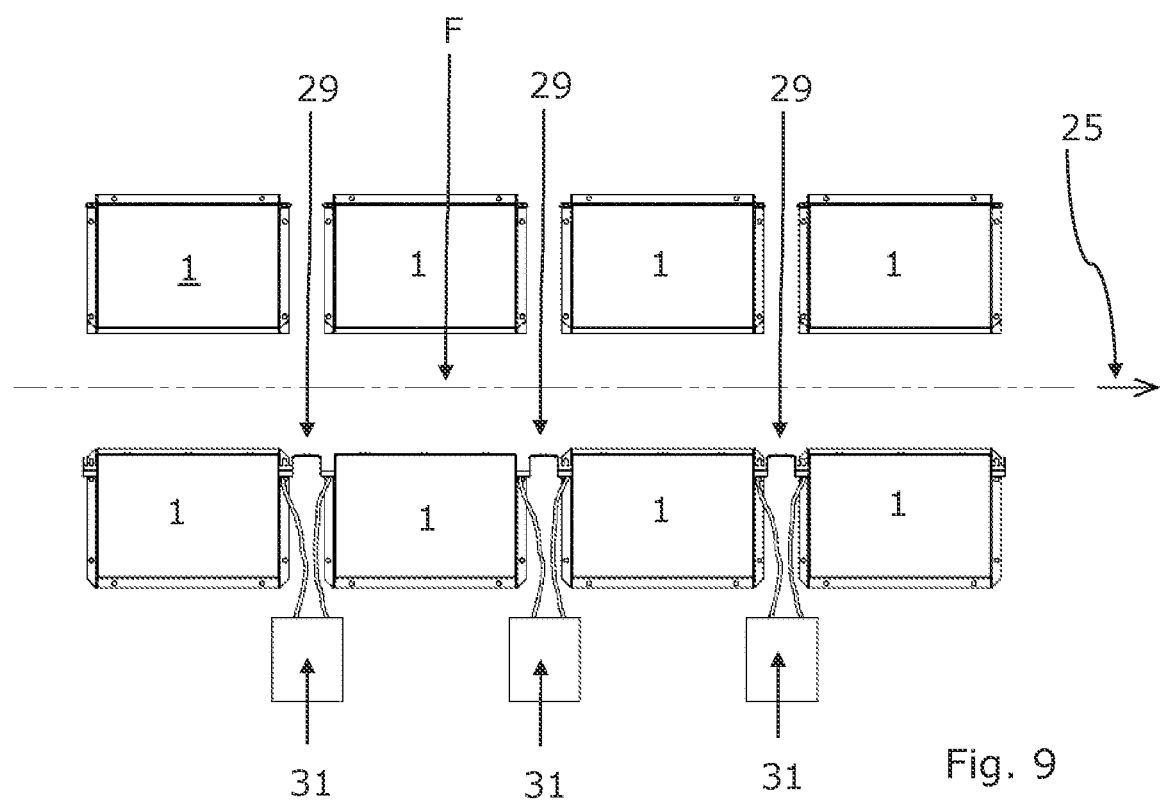

Using FIG. 9, it is now indicated that the nozzle box 1 can have drainage devices 29 laterally, mainly in the form of oil grooves. Preferably, these are arranged at a certain angle so that the oil can drain optimally. Thus, the oil could be trapped in these grooves and collected in the collection container 31 via outflows. In addition, it is possible that intermediate sheets are placed between the nozzle boxes which are designed roof-shaped and also drain off the oil in grooves. This is advantageous as the oil can be collected and the oven base is also not soiled by oil.

In particular, this would be conceivable or even necessary for a simultaneous stretching process (LISIM) as in this process transverse as well as machine direction stretching occurs in the oven. In the case of a sequential stretching process, the machine direction stretching occurs in a machine (MDO) preceding the oven. Much of the oil is already squeezed out in MDO and does not reach the oven. It can therefore be expected that the problem of oil contamination in the oven is even greater in a simultaneous stretching process or in a transverse stretching stage following a machine direction stretching process and thus a significant advantage can be attained by means of the invention.

The invention claimed is:

1. A nozzle box, comprising:
   side walls spaced apart from each other, a base and a ventilation wall spaced apart from it, thereby forming an interior space,
   a plurality of ventilation openings arranged offset to each other is provided in the ventilation wall,
   the nozzle box is provided on its ventilation wall with a plurality of protrusions that are raised by at least a height (H) in relation to sections of ventilation wall or top side or surface of the ventilation wall, said sections being situated adjacent to the protrusions,
   the ventilation openings are arranged and configured in a region of the protrusions in relation to the top side or surface of the ventilation wall positioned offset to each other in such a way that they are further away in relation to the interior space than the top side or surface of the ventilation openings adjacent to the protrusions, and
   the ventilation wall comprises in a transverse direction of the nozzle box opposing side flanges that overlap the side walls of the nozzle box outside the interior space of the nozzle box,
      wherein the protrusions are formed by embossing into the ventilation wall made of a metal sheet,
      wherein the ventilation openings or at least a part of the ventilation openings in top view are configured circular or oblong or n-polygonal in shape, and
      wherein the protrusions comprising ventilation openings positioned centrally therein comprise a shape in top view that corresponds to the shape of the ventilation openings.

2. The nozzle box according to claim 1, wherein the protrusions comprise a boundary wall extending around each one or around at least two or more ventilation openings, said boundary wall extending at an acute angle of inclination α in a cross-sectional view at least in part and/or aligned at least in part perpendicular to the ventilation wall away from the interior space.

3. The nozzle box according to claim 2, wherein the angle of inclination α is less than 90°, and primarily is greater than 50°.

4. The nozzle box according to claim 1, wherein the protrusions are configured converging conically at least in a partial height in a direction extending away from the interior space.

5. The nozzle box according to claim 1, wherein an end section of the protrusion situated away from the top side or surface of the ventilation wall is configured to be crater-free and/or blunt, primarily in form of an opening edge surrounding the corresponding ventilation opening, said opening edge being aligned in particular parallel to the top side or surface of the ventilation wall or deviates from it less than 45°.

6. The nozzle box according to claim 1, wherein the protrusion comprises a height in relation to the top side or surface of the ventilation wall that is greater than 0.5 mm, and/or the protrusion comprises a height in relation to the top side or surface of the ventilation wall that is less than 5.0.

7. The nozzle box according to claim 1, wherein the ventilation openings are arranged or configured spaced apart in a longitudinal direction L of the nozzle box in one or in several rows provided in the transverse direction (Q) of the nozzle box in such a way that two lateral edges of the ventilation wall are connected to each other via bridges of material.

8. The nozzle box according to claim 1, wherein the at least two ventilation openings are arranged in a shared protrusion that are surrounded by a shared encircling boundary wall.

9. The nozzle box according to claim 1, wherein the ventilation wall comprises a ventilation wall edge section protruding on an end face in the region of at least one of its end faces, said ventilation wall edge section protruding on the end face being bent from a plane of the ventilation wall opposite the interior space and resting bent over or flanged on the top side of the ventilation wall, thereby forming a mainly strip-shaped protrusion protruding in relation to the top side or surface of the ventilation wall and/or situated higher.

10. The nozzle box according to claim 1, wherein the nozzle box in its longitudinal direction (L) comprises at least two nozzle box sections, wherein at least one nozzle box section is provided on an inner side the ventilation wall with a material tongue extending in an assembly direction or a flange that protrudes on its end face from a corresponding end face of the nozzle box section and is received into a corresponding recess in an adjoining next nozzle box and in doing so covers a gap existing optionally between the two flanged ventilation wall edge sections adjoining each other in the interior of the nozzle box and seals said gap in relation to the interior space of the nozzle box.

11. The nozzle box according to claim 1, wherein the protrusions
   are formed from a mounted material fixture firmly connected to the ventilation wall in a manner impermeable to oil.

12. A stretching unit comprising the nozzle box according to claim 1.

13. The stretching unit according to claim 12, wherein the several nozzle boxes arranged offset to each other in a drawing direction (A) of a plastics film (F) underneath the plastics film (F), and that a drainage device and/or a receiving device, in particular in the form a collection container, for oil flowing away from the top side or surface of the ventilation wall, is provided between at least two nozzle boxes located offset to each other in the drawing direction (A).

* * * * *